United States Patent
Shringeri et al.

(10) Patent No.: US 7,720,842 B2
(45) Date of Patent: May 18, 2010

(54) VALUE-CHAINED QUERIES IN ANALYTIC APPLICATIONS

(75) Inventors: Sanjatha Shringeri, Union City, CA (US); David Lyle, Los Gatos, CA (US); Firoz Kanchwala, Sunnyvale, CA (US)

(73) Assignee: Informatica Corporation, Redwood City, CA (US)

( * ) Notice: Subject to any disclaimer, the term of this patent is extended or adjusted under 35 U.S.C. 154(b) by 0 days.

(21) Appl. No.: 09/906,862

(22) Filed: Jul. 16, 2001

(65) Prior Publication Data

US 2003/0018634 A1    Jan. 23, 2003

(51) Int. Cl.
*G06F 7/00* (2006.01)
*G06F 17/30* (2006.01)

(52) U.S. Cl. .................. 707/722; 707/736; 707/758

(58) Field of Classification Search ............... 707/1–10, 707/102, 104; 705/10; 709/206, 245; 715/500; 702/188
See application file for complete search history.

(56) References Cited

U.S. PATENT DOCUMENTS

| | | |
|---|---|---|
| 5,403,147 A | 4/1995 | Tanaka |
| 5,404,513 A | 4/1995 | Powers et al. |
| 5,405,531 A | 4/1995 | Hitzman et al. |
| 5,410,688 A | 4/1995 | Williams et al. |
| 5,420,688 A | 5/1995 | Farah |
| 5,421,008 A * | 5/1995 | Banning et al. ................ 707/4 |
| 5,455,945 A | 10/1995 | Vanderdrift |
| 5,511,190 A | 4/1996 | Sharma et al. |
| 5,519,859 A | 5/1996 | Grace |
| 5,537,589 A | 7/1996 | Dalal |
| 5,563,999 A | 10/1996 | Yaksich et al. |
| 5,603,024 A | 2/1997 | Goldring |
| 5,655,101 A | 8/1997 | O'Farrell et al. |
| 5,675,785 A | 10/1997 | Hall et al. |
| 5,689,566 A | 11/1997 | Nguyen |
| 5,692,181 A | 11/1997 | Anand et al. |

(Continued)

FOREIGN PATENT DOCUMENTS

EP    0987868 A3    3/2000

(Continued)

OTHER PUBLICATIONS

U.S. Appl. No. 60/255/895, filed Dec. 18, 2000.*

(Continued)

*Primary Examiner*—Cam Y T Truong
(74) *Attorney, Agent, or Firm*—Fenwick & West LLP

(57) ABSTRACT

A method for facilitating the navigation of data generated using an analytic application. In particular, a method of creating and using a query chain to access data is described. The user designates some data field as being of particular interest. A list of further query chains for the user to choose from is shown. The user can select one of these query chains to further navigate the database, modify one of the query chains listed, or can create a new query chain by further navigating the database. The selections made by the user while further navigating the database are recorded and linked into a query chain, which can be stored for later use. Accordingly, user access to a field of particular interest is facilitated, and information of particular interest can be accessed in a timely manner.

14 Claims, 11 Drawing Sheets

U.S. PATENT DOCUMENTS

| | | |
|---|---|---|
| 5,706,495 A | 1/1998 | Chadha et al. |
| 5,708,828 A | 1/1998 | Coleman |
| 5,713,020 A | 1/1998 | Reiter et al. |
| 5,721,903 A | 2/1998 | Anand et al. |
| 5,721,911 A | 2/1998 | Ha et al. |
| 5,778,355 A * | 7/1998 | Boyer et al. .................... 707/2 |
| 5,781,911 A | 7/1998 | Young et al. |
| 5,787,415 A | 7/1998 | Jacobson et al. |
| 5,794,030 A | 8/1998 | Morsi et al. |
| 5,794,228 A | 8/1998 | French et al. |
| 5,794,229 A | 8/1998 | French et al. |
| 5,794,246 A | 8/1998 | Sankaran et al. |
| 5,799,310 A | 8/1998 | Anderson et al. |
| 5,806,060 A | 9/1998 | Borgida et al. |
| 5,822,751 A | 10/1998 | Gray et al. |
| 5,826,258 A | 10/1998 | Gupta |
| 5,832,496 A | 11/1998 | Anand et al. |
| 5,841,437 A * | 11/1998 | Fishkin et al. .............. 345/619 |
| 5,842,213 A | 11/1998 | Odom et al. |
| 5,848,415 A | 12/1998 | Guck |
| 5,854,890 A | 12/1998 | Ramachandran et al. |
| 5,857,197 A | 1/1999 | Mullins |
| 5,870,746 A | 2/1999 | Knutson et al. |
| 5,870,747 A | 2/1999 | Sundaresam |
| 5,873,102 A | 2/1999 | Bridge, Jr. et al. |
| 5,884,262 A | 3/1999 | Wise et al. |
| 5,898,431 A | 4/1999 | Bayles et al. |
| 5,915,019 A | 6/1999 | Ginter et al. |
| 5,933,796 A | 8/1999 | Ashida et al. |
| 5,982,890 A | 11/1999 | Akatsu |
| 5,987,454 A | 11/1999 | Hobbs |
| 5,991,742 A | 11/1999 | Tran |
| 6,002,402 A | 12/1999 | Schacher |
| 6,003,024 A | 12/1999 | Bair et al. |
| 6,003,040 A * | 12/1999 | Mital et al. .................... 707/3 |
| 6,014,670 A | 1/2000 | Zamanian et al. |
| 6,026,388 A * | 2/2000 | Liddy et al. .................... 707/1 |
| 6,032,145 A * | 2/2000 | Beall et al. ..................... 707/5 |
| 6,032,158 A | 2/2000 | Mukhopadhyay et al. |
| 6,044,374 A | 3/2000 | Nesamoney et al. |
| 6,065,007 A | 5/2000 | Muthukrishanan et al. |
| 6,072,492 A | 6/2000 | Schagen et al. |
| 6,078,994 A | 6/2000 | Carey |
| 6,094,651 A * | 7/2000 | Agrawal et al. ................ 707/5 |
| 6,119,167 A | 9/2000 | Boyle et al. |
| 6,122,628 A | 9/2000 | Castelli et al. |
| 6,128,624 A | 10/2000 | Papierniak et al. |
| 6,141,699 A | 10/2000 | Luzzi et al. |
| 6,151,584 A | 11/2000 | Papierniak et al. |
| 6,151,601 A * | 11/2000 | Papierniak et al. ............ 707/10 |
| 6,167,396 A | 12/2000 | Lokken |
| 6,173,310 B1 | 1/2001 | Yost et al. |
| 6,192,364 B1 | 2/2001 | Baclawski |
| 6,205,472 B1 * | 3/2001 | Gilmour .................... 709/206 |
| 6,208,990 B1 | 3/2001 | Suresh et al. |
| 6,216,125 B1 | 4/2001 | Johnson |
| 6,233,575 B1 | 5/2001 | Agrawal et al. |
| 6,269,336 B1 | 7/2001 | Itabashi et al. |
| 6,269,369 B1 | 7/2001 | Robertson |
| 6,272,485 B1 | 8/2001 | Sragner |
| 6,272,598 B1 | 8/2001 | Arlitt et al. |
| 6,292,657 B1 | 9/2001 | Laursen et al. |
| 6,308,203 B1 | 10/2001 | Itabashi et al. |
| 6,336,137 B1 | 1/2002 | Lee et al. |
| 6,339,775 B1 | 1/2002 | Zamanian et al. |
| 6,353,452 B1 * | 3/2002 | Hamada et al. ............. 715/825 |
| 6,369,840 B1 | 4/2002 | Barnett et al. |
| 6,374,263 B1 * | 4/2002 | Bunger et al. ............... 707/201 |
| 6,385,604 B1 | 5/2002 | Bakalash et al. |
| 6,393,386 B1 | 5/2002 | Zager et al. |
| 6,404,884 B1 | 6/2002 | Marwell et al. |
| 6,408,292 B1 | 6/2002 | Bakalash et al. |
| 6,411,936 B1 * | 6/2002 | Sanders ...................... 705/10 |
| 6,418,200 B1 | 7/2002 | Ciccolella et al. |
| 6,421,781 B1 | 7/2002 | Fox et al. |
| 6,424,426 B1 | 7/2002 | Henry |
| 6,430,624 B1 | 8/2002 | Jamtgaard et al. |
| 6,438,522 B1 | 8/2002 | Tate |
| 6,446,059 B1 | 9/2002 | Berger et al. |
| 6,446,062 B1 | 9/2002 | Levine et al. |
| 6,446,096 B1 | 9/2002 | Holland et al. |
| 6,449,619 B1 | 9/2002 | Colliat et al. |
| 6,457,030 B1 | 9/2002 | Adams et al. |
| 6,466,969 B1 | 10/2002 | Bunney et al. |
| 6,477,525 B1 | 11/2002 | Bello et al. |
| 6,480,711 B1 | 11/2002 | Guedalia |
| 6,487,584 B1 | 11/2002 | Bunney |
| 6,493,800 B1 | 12/2002 | Blumrich |
| 6,502,101 B1 | 12/2002 | Verprauskus et al. |
| 6,526,335 B1 | 2/2003 | Treyz et al. |
| 6,535,872 B1 | 3/2003 | Castelli et al. |
| 6,539,359 B1 | 3/2003 | Ladd et al. |
| 6,549,910 B1 | 4/2003 | Tate |
| 6,549,937 B1 | 4/2003 | Auerbach et al. |
| 6,553,366 B1 | 4/2003 | Miller et al. |
| 6,563,912 B1 | 5/2003 | Dorfman et al. |
| 6,564,264 B1 | 5/2003 | Creswell et al. |
| 6,567,804 B1 * | 5/2003 | Ramasamy et al. ............ 707/4 |
| 6,574,599 B1 | 6/2003 | Lim et al. |
| 6,581,054 B1 * | 6/2003 | Bogrett ........................ 707/4 |
| 6,581,062 B1 | 6/2003 | Draper et al. |
| 6,581,068 B1 * | 6/2003 | Bensoussan et al. ..... 707/104.1 |
| 6,491,304 B2 | 7/2003 | Sitaraman et al. |
| 6,601,062 B1 | 7/2003 | Deshpande et al. |
| 6,616,701 B2 | 9/2003 | Doyle |
| 6,629,102 B1 | 9/2003 | Malloy et al. |
| 6,631,497 B1 | 10/2003 | Jamshidi et al. |
| 6,636,870 B2 | 10/2003 | Roccaforte |
| 6,671,689 B2 | 12/2003 | Papierniak |
| 6,704,740 B1 * | 3/2004 | Lang ......................... 707/102 |
| 6,721,728 B2 * | 4/2004 | McGreevy ................... 707/3 |
| 6,732,088 B1 * | 5/2004 | Glance ........................ 707/3 |
| 6,801,910 B1 * | 10/2004 | Bedell et al. ................... 707/6 |
| 6,922,684 B1 * | 7/2005 | Aldridge et al. ............. 706/60 |
| 6,963,867 B2 * | 11/2005 | Ford et al. ..................... 707/3 |
| 6,996,569 B1 * | 2/2006 | Bedell et al. ................ 707/100 |
| 7,039,871 B2 * | 5/2006 | Cronk ........................ 715/741 |
| 7,076,475 B2 * | 7/2006 | Honarvar ..................... 706/47 |
| 7,080,070 B1 * | 7/2006 | Gavarini ....................... 707/5 |
| 7,080,090 B2 * | 7/2006 | Shah et al. ................... 707/102 |
| 7,110,998 B1 * | 9/2006 | Bhandari et al. ............... 707/4 |
| 7,302,639 B1 * | 11/2007 | Everhart et al. ............. 715/234 |
| 2001/0047355 A1 * | 11/2001 | Anwar ......................... 707/5 |
| 2001/0049677 A1 * | 12/2001 | Talib et al. .................... 707/3 |
| 2002/0035565 A1 | 3/2002 | Shah et al. |
| 2002/0056081 A1 | 5/2002 | Morley et al. |
| 2002/0059267 A1 | 5/2002 | Shah et al. |
| 2002/0065815 A1 * | 5/2002 | Layden ........................ 707/3 |
| 2002/0077787 A1 * | 6/2002 | Rappaport et al. .......... 702/188 |
| 2002/0077997 A1 * | 6/2002 | Colby et al. ................... 707/1 |
| 2002/0099563 A1 * | 7/2002 | Adendorff et al. ............. 705/1 |
| 2002/0099691 A1 | 7/2002 | Lore et al. |
| 2002/0112237 A1 | 8/2002 | Kelts |
| 2002/0172247 A1 | 9/2002 | Bayer et al. |
| 2002/0161770 A1 | 10/2002 | Shapiro et al. |
| 2003/0172247 A1 * | 9/2003 | Bayer et al. ................. 712/12 |

FOREIGN PATENT DOCUMENTS

| | | |
|---|---|---|
| EP | 1043671 A2 | 10/2000 |
| EP | 1164511 A2 | 12/2001 |
| GB | 2350758 | 12/2000 |
| GB | 2 357 596 | 6/2001 |
| WO | WO 99/24922 | 5/1999 |

| | | |
|---|---|---|
| WO | WO 00/04466 | 1/2000 |
| WO | WO 00/08581 | 2/2000 |
| WO | WO 00/77707 | 12/2000 |
| WO | WO 01/18728 | 3/2001 |
| WO | WO 01/20438 | 3/2001 |
| WO | WO 01/24040 A1 | 4/2001 |
| WO | WO 02/44953 | 6/2002 |

OTHER PUBLICATIONS

Juhne J. et al.: "Ariadne, a Java Based Guided Tour System for The World Wide Web" Computer Networks and ISDN Systems, North Holland Publishing, Amsterdam, NL, vol. 30, No. 1-7, Apr. 1, 1998, pp. 131-139, XP004121433 ISSN: 0169-7552, the whole document.

Kovacs L. et al. "Aqua: An Advanced User Interface for the Dienst Digital Library System" 8$^{th}$ Delos Workshop: User Interfaces for Digital Libraries, Online, Oct. 21-23, 1998, XP002262893 Stockholm, Sweden ISBN: 2-91335-07-9, p. 2, line 3, p. 3, line 2.

Jaczynski M. and Trousse, B: "Broadway: A Case-Based System for Cooperative Information Browsing on the World Wide Web" Collaboration Between Human and Artificial Societies, Online 1999, XP0002262894, the whole document.

Chaudhuri S. et al.: An Overview of Data Warehousing and OLAP Technology: Sigmod Record, Sigmod, New York, NY, US, vol. 26, No. 1 Mar. 1997, pp. 65-74, XP002193792 ISSN 0163-5808, the whole document.

24X7 The Magazine of Nonstop Computing, "Compaq's Zero Latency Enterprise Initiative," vol. 1, No. 2, Oct. 2000, pp. 1-25.

"A Process for Selective Routing of Servlet Transcoding Modules," IBM Technical Disclosure Bulletin, vol. 42, Issue 422, Jun. 1999 UK.

Multi-Modal Data Access Research Disclosure, Kenneth Mason Publications, Hampshire, GB, No. 426, Oct. 1999, pp. 133-1386.

"Parameterized XSL Style Sheets," Research Disclosure, vol. 42, No. 423, Jul. 1, 1999, Havant, UK, Article No. 423110.

Anand, V. J. et al. "Data Warehouse Architecture for DDS Applications." Australian Journal of Information Systems. Sep. 1996, AJIS Publishing, Australia, vol. 4, No. 1, pp. 43-53.

Ballinger, C. et al., "Born to be Parallel. Why Parallel Origins Give Teradata an Enduring Performance Edge," Bulletin of the Technical Committee on Data Engineering, vol. 20, No. 2, Jun. 1997, IEEE Comput. Soc., Los Alamitos, CA, US.

Barrett, R. et al., "Intermediaries: An Approach to Manipulating Information Streams," IBM Systems Journal, IBM Corp., Armonk, New York, U.S. vol. 38, No. 4, 1999, pp. 629-641.

Bellatreche, L. et al., "OLAP Query Processing for Partitioned Data Warehouses," Proceedings 1999 Int'l. Symposium on Database Applications in Non-Traditional Environments (Dante'99) (CAT. No. PR00496), Kyoto, JP, Nov. 28-30, 1999, pp. 35-42, IEEE Comput. Soc., Los Alamitos, CA US ISBN: 0-7695-0496-5.

Bello, R.G. et al., "Materialized Views in Oracle," Proceedings of the Int'l. Conf. On Very Large Data Bases, NY, Aug. 24, 1998, pp. 659-664.

Chamberlin, D. et al., "A Complete Guide to DB2 Universal Database," 1992, pp. 659-600.

Chan, R. "12 Steps of Creating a Successful Data Warehouse," Proceedings of the 8th International Database Workshop (Industrial Volume), Proceedings of the 8th International Hong Kong Computer Society Database Workshop, Data Mining, Data Warehousing and CLI, pp. 227-248, ISBN 981-3083-53-0, 1997, Singapore, Springer-Verlag Singapore, Singapore.

Curley, K. et al. "The Rationale for Developing a Corporate Data Warehouse and the Development of a Model for Sharing Data in a Data Warehouse Environment." OOIS '95. 1995 International Conference on Object Oriented Information Systems Proceedings, Proceedings of 1995, International Conference on Object Oriented Information Systems, Dublin, Ireland, Dec. 18-20, 1995, pp. 351-366, Berlin, Germany, Springer-Verlag, Germany.

Datta, A., et al., "A Case for Parallelism in Data Warehousing and OLAP," Ninth Int'l. Workshop on Database and Expert Systems Applications, Vienna, AT, IEEE Comput. Soc., Los Alamitos, CA, US, Aug. 26, 1998, pp. 226-231.

Dawson, F. et al., 'RFC 2426 vCard MIME Directory Profile,' Network Working Group, Request for Comments 2426, Sep. 1998.

Deutsch, A. et al., "Storing Semistructured Data with STORED," ACM SIGMOD Record, Proceedings of the 1999 ACM SIGMOD International Conference on Management of Data, Jun. 1999, vol. 28, Issue 2.

Duncan, K., et al., "Optimizing the Data Warehousing Environment for Change: the Persistent Staging Area," Cutter IT Journal, Jun. 1999, Cutter Inf. Corp. USA, vol. 12, No. 6, pp. 28-35.

Fernanez, M. et al., "SilkRoute: Trading Between Relations and XML," WWW9/Computer Networks, 33(1-6), pp. 723-745, 2000.

Florescu, D. et al., "A Performance Evaluation of Alternative Mapping Schemes for Storing SML in a Relational Database," Technic Report 3680, INRIA, 1999.

Freytag, C. et al., "Resource Adaptive WWW access for Mobile Applications," Computers and Graphics, Pergamon Press Ltd., Oxford, GB, vol. 23, No. 6, Dec. 1999, pp. 841-848.

Fry, J.P, "Conversion Technology, An Assessment," ACM SIGMIS Database, vol. 12-13, No. 4-1, Jul. 1981, pp. 39-61.

Hammer, J. et al., "Extracting Semistructured Information From the Web," Proceedings of the Workshop on Management of Semi-structured Data, Mar. 16, 1997, pp. 1-25.

Hori, M. et al., "Annotation-Based Web Content Transcoding," Computer Networks, Elsevier Science Publishers B.V., Amsterdam NL., vol. 33, No. 106, Jun. 2000, pp. 197-211.

Housel, B. et al., "A High-Level Data Manipulation Language for Hierarchical Data Structures," International Conference on Management of Data, 1976, pp. 155-169.

Informatica Press Releases, "Informatica Delivers Industry's First Synchronized Data Marts With Newest Version of Powermart Suite," <http://www.informatica.com/syndata_-_052798.html>, pp. 1-4, May 27, 1997.

Informatica Press Releases, "Informatica Unveils Architecture for Networking Multiple Data Marts Into an Enterprise-Wide Data Warehouse," <http://www.informatica.com/edm_-_082697.html>, pp. 1-4, Aug. 26, 1997.

Jones, K., "An Introduction to Data Warehousing: What are the Implications for the Network," 1998, International Journal of Network Management, vol. 8, pp. 42-56.

Kim, W., "On Optimizing an SQL-Like Nested Query," ACM Transactions on Database Systems, Association for Computing Machinery, New York, US, vol. 7, No. 3, Sep. 1, 1982, pp. 443-469.

Kitayama, F. et al., "Design of a Framework for Dynamic Content Adaptation to Web-enabled Terminals and Enterprise Applications," Software Engineering Conference, 1999. Proceedings Sixth Asian Pacific Takamatsu, Japan, Dec. 7-10, 1999, Los Alamitos, CA, US.

Lum, V. Y. et al., "A General Methodology for Data Conversion and Restructuring," IBM Journal of Research and Development, IBM Corporation, Armonk, US, vol. 20, No. 5, Sep. 1, 1976, pp. 483-497.

Makpangou, M. et al., "Replicated Directory Service for Weakly Consistent Distributed Caches," INRIA SOR group-78143 Le Chesnay Cedex, France.

Mohania, M. et al.: "Advances and Research Directions in Data Warehousing Technology," Ajis. Australian Journal of Information Systems, Wollongong, Au. vol. 7, No. 1, Sep. 1999, pp. 41-59.

Mumick, I. S. et al. "Maintenance of Data Cubes and Summary Tables in a Warehouse," SIGMOD 1997. ACM SIGMOD International Conference on Management of Data, Tucson, AZ, USA, May 13-15,1997, vol. 26, No. 2, pp. 100-111, XP002074807, Jun. 1997, ACM, USA.

Mumick, I.S.,."Magic is Relevant," Sigmod Record, Sigmod, New York, NY, US, vol. 19, No. 2, Jun. 1, 1990, pp. 247-258.

Rodriguez, J. et al., "IBM WebSphere Transcoding Publisher V1:1: Extending Web Applications to the Pervasive World," <http://ibm.com/redbooks>, Jul. 2000, pp. 1039.

Rousskov, A. et al., "Cache Digests," Computer Networks and ISDN Sytems, 30 (1998) 2144-2168.

Roy, P. et al., "Don't Trash Your Intermediate Results, Cach'em," Technical Report, Online, Mar. 2, 2000, pp. 1-22.

Shneiderman, B. et al., "An Architecture for Automatic Relational Database System Conversion," ACM Transactions on Database Systems, vol. 7, No. 2, 1982.

Schneier, B., "Applied Cryptography, Second Edition," 1996, pp. 189-196, 226-227.

Shanmugasundaram, J. et al., "Relational Databases for Querying SML Documents Limitations and Opportunities," Proc. Of VLBD, pp. 302-314, 1999.

Seshadri, P. et al., "SQLServer for Windows CE-A Database Engine for Mobile And Embedded Platforms," Data Engineering 2000. Proceedings 16$^{th}$ International Conference in San Diego, CA, US, Feb. 29, 2000, IEE Computer Soc., US, Feb. 29, 2000, pp. 642-644.

Shimura, T. et al., "Storage and Retrieval of XML Documents Using Object-Relational Databases," Proc. Of DEXA, pp. 206-217, 1999.

Shu, N. et al., "Convert: A High Level Translation Definition Language for Data Conversion," Communications of the ACM, vol. 18, No. 10, Oct. 1975, pp. 557-567.

Shu N. et al., "Convert: A High Level Translation Definition Language for Data Conversion," Proceedings of the 1975 ACM SIGMOD International Conference on Management of Data, May 1975, p. 111.

Shu, N. et al., "Express: A Data EXtraction, Processing, and REStructuring System," ACM Transactions on Database Systems, vol. 2, No. 2, Jun. 1977, pp. 134-174.

Shu, N., "Automatic Data Transformation and Restructuring," IEEE, 1987, pp. 173-180.

Squire, C., "Data Extraction and Transformation for the Data Warehouse," ACM Proceedings of SIGMOD. International Conf. On Management of Data, vol. 24, No. 1, Mar. 1, 1995, p. 446.

Weyman, P.J., "The Case for a Process-Driven Approach to Data Warehousing," Database and Network Journal, A.P. Publications, London, FB, vol. 27, No. 1, Feb. 1, 1997, pp. 3-6.

White, C., "Data Warehousing: Cleaning and Transforming Data," INFO DB, vol. 10, No. 6, Apr. 1997, pp. 11-12.

White, C., "Managing Data Transformations," byte, McGraw-Hill Inc., St. Peterborough US, vol. 22, No. 12, Dec. 1, 1997, pp. 53-54.

Informatica Corporation, Release Notes, PowerCenter 1.6, PowerMart 4.6, Aug. 1999, pp. 1-30.

Informatica Corporation, User Guide, PowerCenter 1.6, PowerMart 4.6, Jul. 1999, pp. i-xxvii and 144-186 (Table of Contents, Preface, Chapters 6 & 7).

Jühne, J., et al., "Ariadne: A Java-Based Guided Tour System for the World Wide Web," Computer Networks and ISDN Systems, 1998, pp. 131-139, vol. 30.

Canadian Office Action, Canadian Application No. 2,453,863, Mar. 25, 2009, 2 pages.

* cited by examiner

300

400

500

Summary of Bookings, Billings and Backlog

| Calendar Month | Net Booking Amt | Net Billing Amt | Operational Background Amt |
|---|---|---|---|
| 2000-M08 | $268,920,477 | $104,682,757 | $6,824,069 |
| 2000-M07 | $140,082,240 | $145,830,473 | $5,021,157 |
| 2000-M06 | $30,534,070 | $28,691,551 | $1,581,367 |
| 2000-M05 | $67,752,773 | $55,803,199 | $1,280,915 |
| 2000-M04 | $71,792,772 | $72,798,624 | $494,973 |
| 2000-M03 | $37,019,935 | $40,105,157 | $290,365 |
| 2000-M02 | $21,252,259 | $17,230,539 | $69,293 |
| 2000-M01 | $3,422,719 | $639,910 | $540,130 |
| Total: | $640,777,248 | $465,782,213 | $15,102,269 |

BBB Analysis

| Month | Order Value | Number of Orders | Average Order Value |
|---|---|---|---|
| Jan-2000 | $9,876.00 | 98 | $100.78 |
| Feb-2000 | $10,001.00 | 96 | $104.18 |
| Mar-2000 | $27,573.00 | 90 | $306.37 |
| Apr-2000 | $29,876.00 | 88 | $339.50 |
| May-2000 | $30,009.00 | 88 | $341.01 |
| Jun-2000 | $33,030.00 | 90 | $370.03 |
| Jul-2000 | $40,228.00 | 95 | $432.45 |
| Aug-2000 | $43,974.00 | 98 | $448.71 |
| Sep-2000 | $64,219.00 | 102 | $629.60 |
| Oct-2000 | $87,722.00 | 120 | $731.02 |
| Nov-2000 | $89,322.00 | 120 | $744.35 |
| Dec-2000 | $100,000.00 | 120 | $833.33 |
| Total: | $566,103.00 | 1205 | $469.80 |

FIGURE 6F

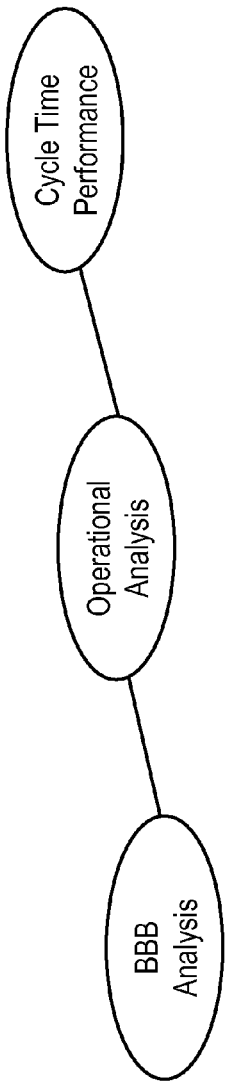

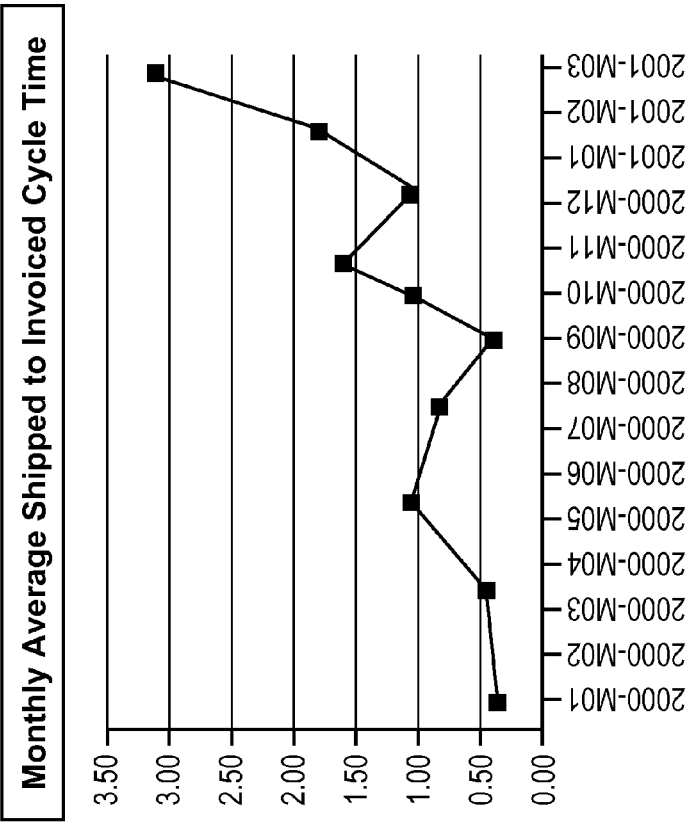

Having stepped back to the Operational Analysis cell, the user is now guided to the Cycle Time Performance cell.

Again, there is a report that turns data into information that should provide another view to what might be causing the Backlog trend (identified at the beginning of the BBB Analysis).

In this case, the Monthly Average Shipped to Invoice Cycle Time report suggests that along with an increase in Backlogs, there may be additional inefficiencies in the organization's internal performance from shipping products to invoicing customers.

Enabled by the Guided Analysis functionality of the Darwin Release, the user will continue down logical analysis paths as data is transformed into actionable intelligence.

VALUE-CHAINED QUERIES IN ANALYTIC APPLICATIONS

TECHNICAL FIELD

The present invention relates to data management systems. More specifically, the present invention pertains to a method and system for navigating data generated by analytic applications.

BACKGROUND ART

Due to the increased amounts of data being generated, stored, and processed today, operational databases are constructed, categorized, and formatted for operational efficiency (e.g., throughput, processing speed, and storage capacity). The raw data found in these operational databases often exist as rows and columns of numbers and code that appear bewildering and incomprehensible to business analysts and decision makers. Furthermore, the scope and vastness of the raw data stored in modern databases render it harder locate usable information. Hence, "analytic applications" have been developed in an effort to help interpret, analyze, and compile the data so that it may be more readily understood by a business analyst. These applications map, sort, categorize, and summarize the raw data before it is presented for display, so that individuals can interpret data and use it as the basis for making decisions. However, for users not experienced in the nuances of constructing a query, the amount of effort required to get specific data may be burdensome to many users.

Given the many different types of source data available, and the many ways that the source data can be transformed and combined, large amounts of data are available that can be difficult for a user to navigate. An example is a user who has identified a problem area in business performance which requires further investigation. This user may need to go through a number of fields of data in order to identify exactly what has caused the problem. For a user who is skilled in constructing a query, this may be an easy task, but less skilled users may find it difficult to navigate the database and find the root cause of the problem.

Another user may spend a great deal of time searching through databases seeking particular items of information such as the business metrics that provide a concise measure of the performance or efficiency of a business (e.g., total sales revenue, margin, etc.). Because the information may change dramatically and/or frequently, a user may need to make such time-consuming searches on a regular basis. For a user who must access data regularly, these searches can take an inordinate amount of time.

Hence, it is desirable to facilitate access to pertinent information in the large databases defined by analytic applications, especially items of information of particular interest to a user. It is also desirable for the user to be able to reach a particular data field, or conduct multiple searches of related data fields, without having to recreate the entire search each time. The present invention provides a method and system that meet the above needs.

SUMMARY OF THE INVENTION

The present invention provides a method and system that can facilitate user access to information in the large databases defined by analytic applications, and that can allow the user to efficiently use his/her time to locate and access information of particular interest. The present invention also provides a method and system that can allow a user to access new information of particular interest in a timely manner. The present invention further provides a method and system that allow a user to reach a particular data field to conduct multiple searches of related data fields without having to recreate the entire search each time.

A method and system for facilitating access to information defined by an analytic application are described. In particular, a method of implementing query chains in analytic applications is described. In one embodiment, the information and data are stored in a repository. Navigation of a database is expedited by presenting to the user a series of query options based upon what data field currently is being displayed. This allows a guided analysis based upon anticipated useful queries or upon prior queries which accessed the current data field. These options can be generated from a static table of queries or a dynamic table which is updated by users. The table of options can be standardized or modified for each customer installation. The user can continue a query without having to choose the attributes, metrics, and filters of the next query. Or, if the user so desires, additional filters, metrics, and attributes can be added to one of the query options generated by the current data field. Or, the user can also choose to not use any of the query options and construct his/her own query. The user can save this newly constructed query chain and add it to the list of pre-defined queries for the preceding data field.

In another embodiment, the user designates a query chain. The user will be able to return to this field in subsequent searches without having to navigate the database. This will be useful in situations where the user may be conducting a search later and needs to return to that last field. In one step, the user will be able to access the needed data rather than having to recreate the steps performed in navigating the database.

Thus, in accordance with the present invention, navigating the vast amount of information defined by an analytic application is facilitated, and information of particular interest can be accessed in a timely manner.

BRIEF DESCRIPTION OF THE DRAWINGS

The accompanying drawings, which are incorporated in and form a part of this specification, illustrate embodiments of the present invention and together with the description, serve to explain the principles of the invention.

FIGS. 6A-6F illustrate a scenario in which a guided analysis assists a user in obtaining detailed information of business metrics in accordance with one embodiment of the current invention.

DETAILED DESCRIPTION OF THE INVENTION

A system and method for navigating data generated using an analytic application is described. While numerous details are set forth in order to provide a thorough understanding of the present invention, it should be understood that it is not intended to limit the invention to this particular embodiment alone. On the contrary, the invention is intended to cover alternatives, modifications and equivalents, which may be included within the spirit and scope of the invention as defined by the appended claims. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating," "receiving," "executing," "linking," "recording," and "duplicating" or the like, can refer to the actions and processes (e.g., processes 400 and 500 of FIGS. 4 and 5) of a computer system or similar electronic computing device. The computer system, or similar electronic computing device, manipulates and transforms data represented as physical (electronic) quantities within the computer system's registers and memories into other data similarly represented as physical quantities within the computer system memories or registers or other such information storage, transmission, or display devices.

Figure 1:
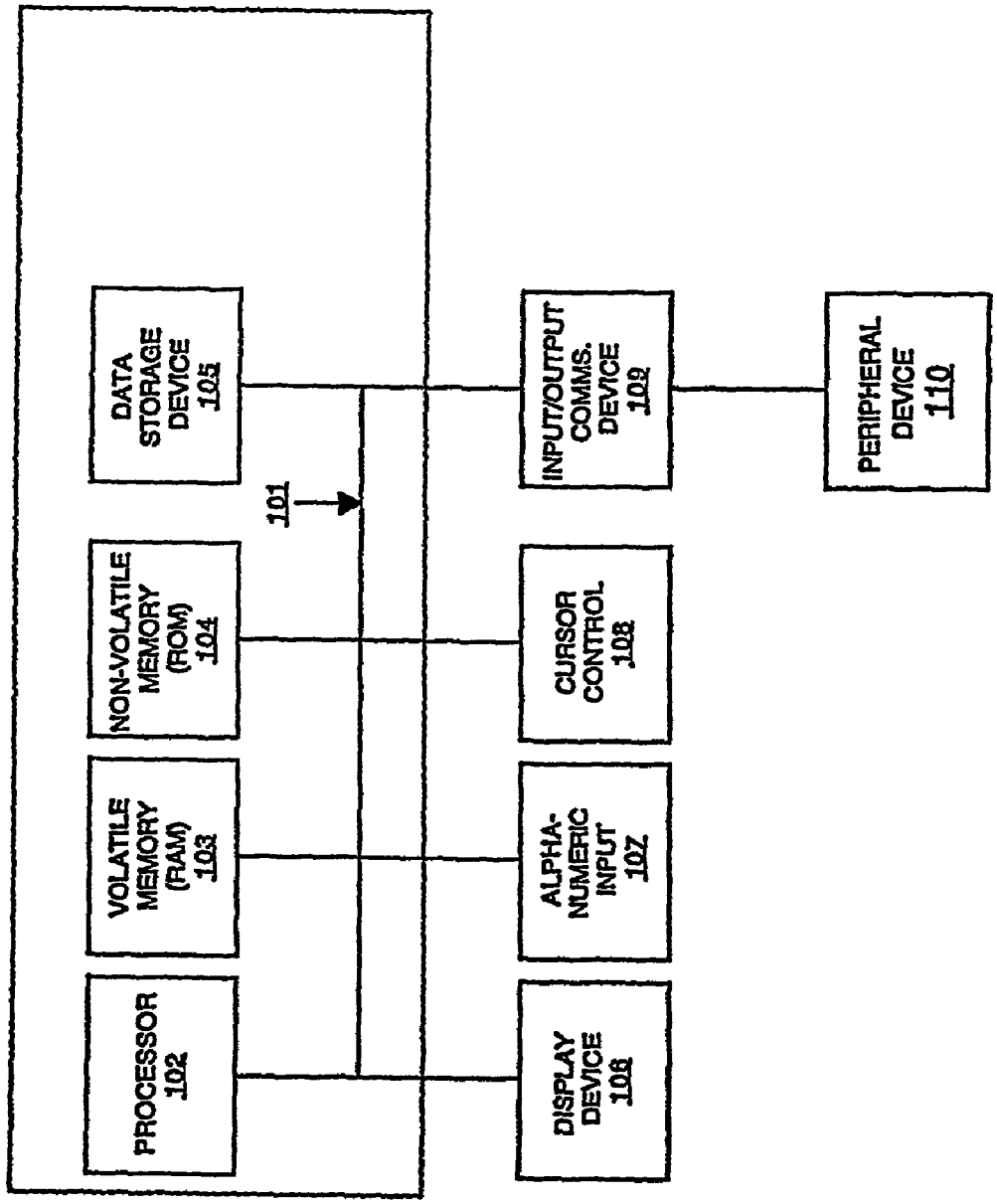
FIG. 1 is a block diagram of an exemplary computer system upon which embodiments of the present invention may be practiced.

With reference to FIG. 1, portions of the present invention are comprised of computer-readable and computer-executable instructions that reside, for example, in computer system 100 which can be used as a part of a general purpose computer network. It is appreciated that computer system 100 of FIG. 1 is exemplary only and that the present invention can operate within a number of different computer systems including general-purpose computer systems, embedded computer systems, laptop computer systems, hand-held computer systems, and stand-alone computer systems.

In the present embodiment, computer system 100 includes an address/data bus 101 for conveying digital information between the various components, a central processor unit (CPU) 102 for processing the digital information and instructions, a volatile main memory 103 comprised of volatile random access memory (RAM) for storing the digital information and instructions, and a non-volatile read only memory (ROM) 104 for storing information and instructions of a more permanent nature. In addition, computer system 100 may also include a data storage device 150 (e.g., a magnetic, optical, floppy, or tape drive or the like) for storing vast amounts of data. It should be noted that the software program for performing the query chaining process of the present invention can be stored either in volatile memory 103, data storage device 105, or in an external storage device (not shown). A computer storage medium includes a magnetic disk, optical disk, tape drive, RAM or ROM.

Devices which are optionally coupled to computer system 100 include a display device 106 for displaying information to a computer user, an alpha-numeric input device 107 (e.g., a keyboard), and a cursor control device 108 (e.g., mouse, trackball, light pen, etc.) for inputting data, selections, updates, etc. Computer system 100 can also include a mechanism for emitting an audible signal (not shown).

Referring still to FIG. 1, optional display device 106 of FIG. 1 may be a liquid crystal device, cathode ray tube, or other display device suitable for creating graphic images and alpha-numeric characters recognizable to a user. Optional cursor control device 108 allows the computer user to dynamically signal the two dimensional movement of a visible symbol (cursor) on a display screen of display device 106. Many implementations of cursor control device 108 are known in the art including a trackball, mouse, touch pad, joystick, or special keys on alpha-numeric input 107 capable of signaling movement of a given direction or manner of displacement. Alternatively, it will be appreciated that a cursor can be directed and/or activated via input from alpha-numeric input 107 using special keys and key sequence commands. Alternatively, the cursor may be directed and/or activated via input from a number of specially adapted cursor directing devices.

Furthermore, computer system 100 can include an input/output (I/O) signal unit (e.g., interface) 109 for interfacing with a peripheral device 110 (e.g., a computer network, modem, mass storage device, etc.). Accordingly, computer system 100 may be coupled in a network, such as a client/server environment, whereby a number of clients (e.g., personal computers, workstations, portable computers, mini-computers, terminals, etc.) are used to run processes for performing desired tasks (e.g., inventory control, payroll, billing, etc.).

Figure 2:
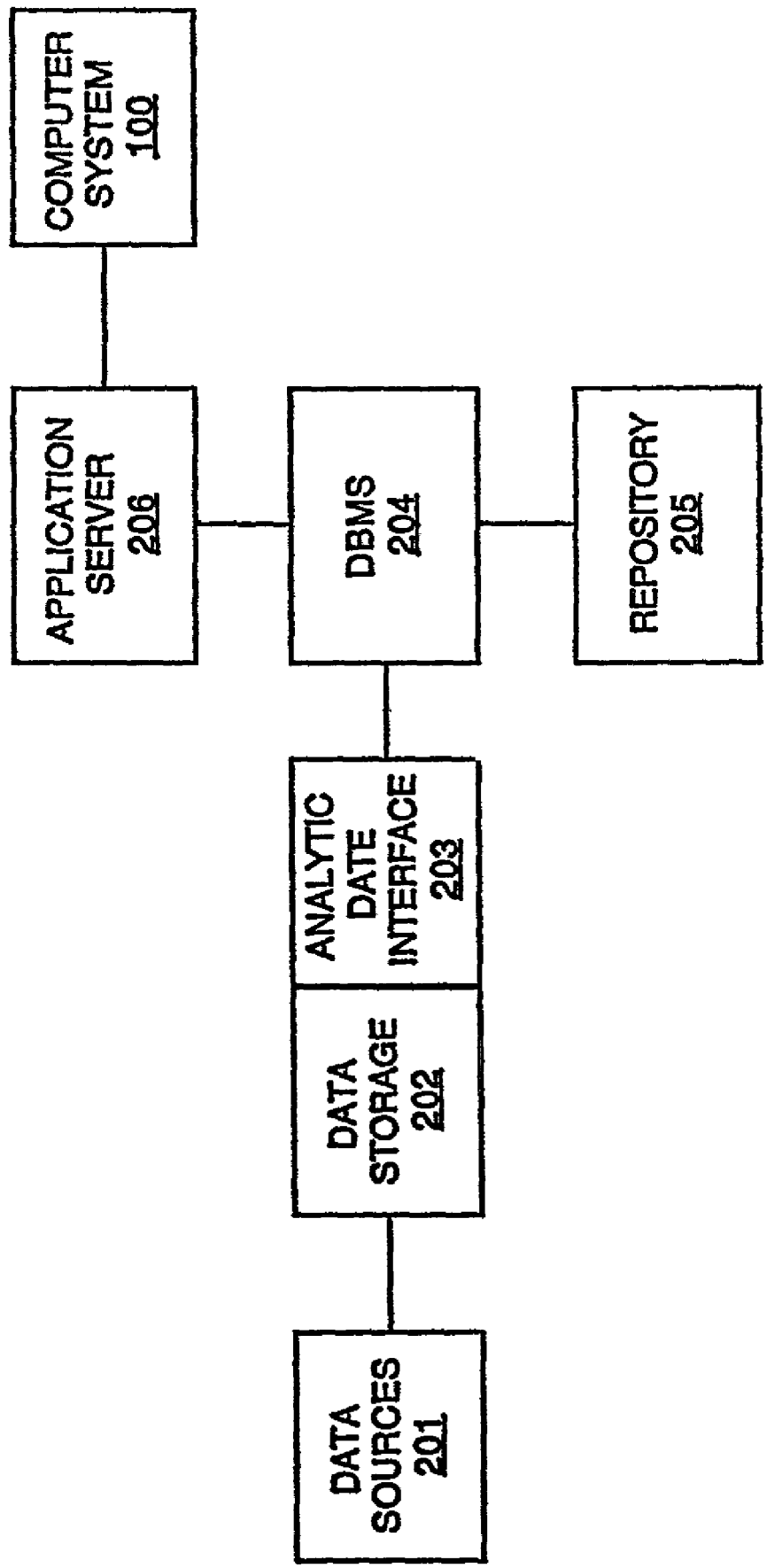
FIG. 2 is a block diagram of an exemplary system for implementing an analytic application upon which embodiments of the present invention may be practiced.

FIG. 2 illustrates one embodiment of a system 200 for implementing an analytic application in accordance with the present invention. Data sources 201 includes one or more sources of operational data resulting from business and financial transactions, equipment performance logs, and the like. These data sources can be based on and formatted according to a Relational Database Management System (RDBMS) (such as from Oracle, Informix, Sybase, Microsoft, etc.), and Enterprise Resource Planning (ERP) system, Service Advertising Protocol (SAP), flat files, and other data transmission formats, either planned or envisioned including XML, WML, HDML, HTML, and I-mode HTML.

Data storage 202 is for storing operational data and the like from data sources 201, typically using a high capacity mass storage device (such as hard disk drives, optical drives, tape drives, etc.). In one embodiment, data storage 202 is a data warehouse. Data storage 202 is coupled to a database management system (DBMS) 204 by analytic data interface 203.

DBMS 204 executes an analytic application such as a data mart application. A repository 205 is coupled to (or integrated with) DBMS 204 for storing information from the database management system.

In one embodiment, data are generated using a process such as the Transformation Definition Language (TDL) process described in U.S. Pat. No. 6,014,670, assigned to the assignee of the present invention and hereby incorporated by reference. There are at least three styles of calculating data (e.g., business metrics): periodic, on demand, and continuous (real time). In the periodic style, data are calculated at predetermined intervals (e.g., hourly, daily, weekly, etc.) and stored in repository 205, and the most recent data are provided to the requester. In the on demand style, the data are calculated in response to a user request. These data may be cached or persisted in some manner (e.g., in repository 205), but do not exist or have value until they are initially requested. In the continuous (real time) style, data are updated as underlying data are updated. For example, a business metric describing the moving average for the inventory of a particular item gets updated as the inventory level for that item is updated. In each case, the requester gets the freshest data.

It is appreciated that business metrics can include any number of either the commonly used metrics for measuring business performance and efficiency, or unique business metrics defined by a user of an analytic application. Business metrics include, but are not limited to, measures of accounts receivable, accounts payable, general ledger, and cash flow. Metrics for accounts receivable can include, but are not limited to: accounts receivable balances, accounts receivable transactions, quality of sales, receivables-to-sales ratio, average collection period, customer credit reports, days outstanding, ratio of cash receipts to billed sales and payments in progress, ratio between ending accounts receivable balance and sum of billed sales, progress payments and beginning balances, ratio of ending receivables balance to cash receipts, accounts receivable turnover, average receivables amount, aging receivables by period, day of sales in receivables ratio, and current period collection rate. Metrics for accounts payable can include, but are not limited to: accounts payable balances, accounts payable transactions, quality of purchase, accounts payable turnover ratio, disbursements-to-payables ratio, days outstanding, payables-to-purchase ratio, average payment period, vendor credit analysis, ratio of cash disbursements to invoiced receipts, ratio between ending accounts payable balances and sum of incoming invoiced amounts, progress payments and beginning balances, ratio of ending payables balance to cash disbursements, payables-to-sales ratio, average payables amount, aging payables by period, day of purchase in payables ratio, and current period payment rate. General ledger metrics can include, but are not limited to: account balances, balance sheet plus profit/loss statement, revenues, costs, gross margins, and net profits. Cash flow metrics can include, but are not limited to: projected cash flow from receivables, cash flow from operations, and cash on hand.

Referring still to FIG. 2, in the present embodiment, an application server 206, exemplified by computer system 100 in FIG. 1, is interposed between the DBMS 204 and a computer system 100 as exemplified in FIG. 1. Application server 206 may incorporate DBMS 204 and repository 205, or these may be separate entities.

Figure 3:
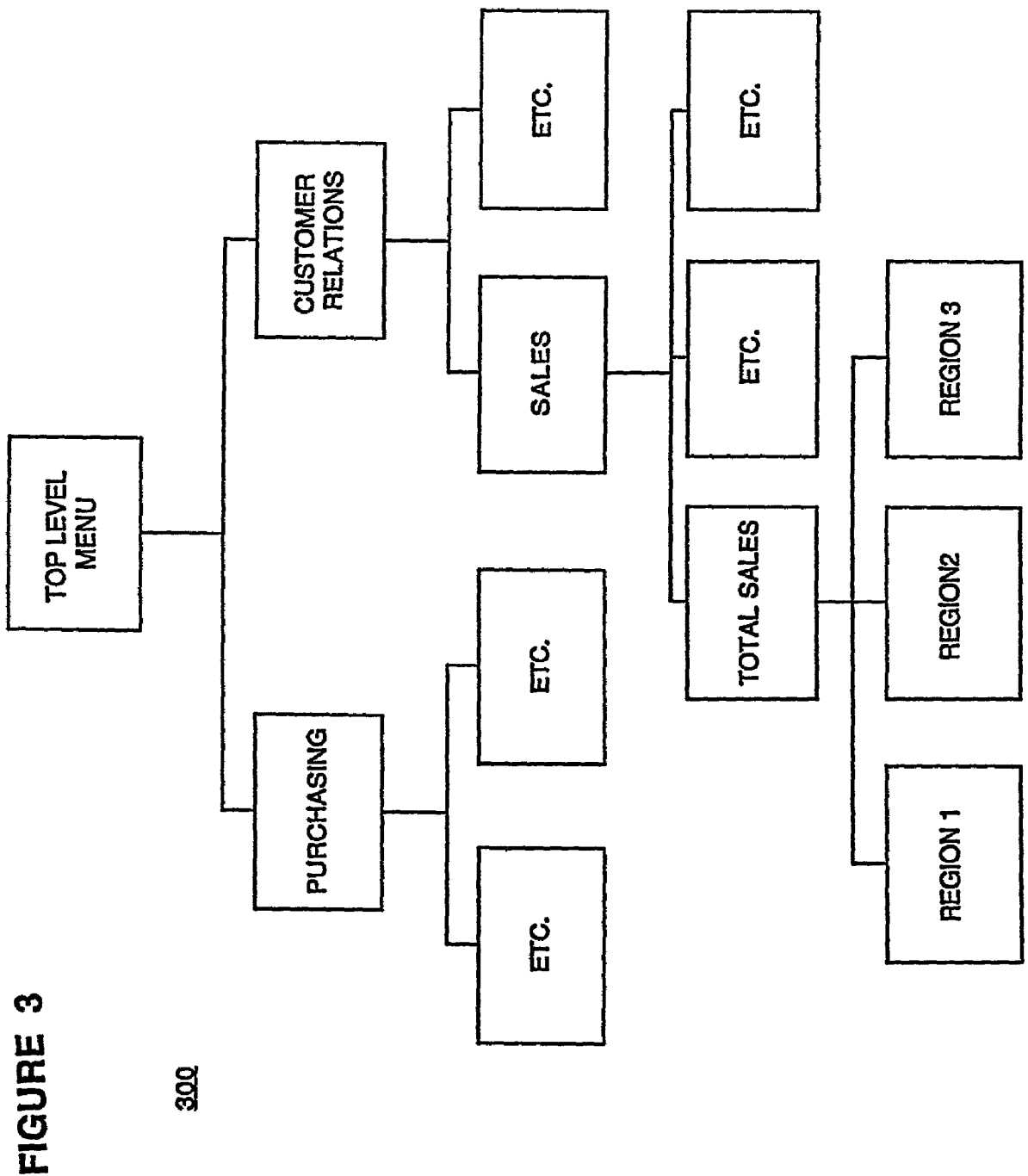
FIG. 3 illustrates an exemplary hierarchical organization of data created when an analytical application executes a query chain, in accordance with one embodiment of the present invention.

FIG. 3 exemplifies the type of information that may be contained in a repository 205. The hierarchy shown indicates the types of paths that may be followed by a user navigating a database by executing a query chain. While FIG. 3 implies that repository 205 itself may be based upon a hierarchical organization of data, this is not necessarily the case. One embodiment of the current invention is employed on a relational database. In a relational database, separate tables of information are joined in response to a query command to create usable information.

More specifically, while repository 205 is shown in FIG. 3 as having one "parent" for each table in a level, in fact there may be multiple parents for a table. That is, "total sales" is shown as descending from "sales"; in actuality, "total sales" may descend from many other parents, and in turn may be the parent for multiple tables at a lower level in repository 205. Thus, in accordance with the present invention, a user may operate further on information found through navigation of the database. That is, a user may reach a particular business metric by following one "path" through the database, but can leave that business metric by a different path, either back up the query chain or to a level deeper in the database.

In repository 205, as users navigate the database, they are presented with a number of choices at each level. In this example, the user starts at the top level menu and can choose from purchasing or customer relations. After selecting customer relations, the user can then select the sales, or marketing tables. From sales, the user further navigates the database, accessing the total sales key, where the user is given the option of further investigating total sales for regions 1, 2, and 3. The user can navigate up or down this hierarchy, for example going back up to the sales key if necessary. Alternatively, the user could access additional information at any of these levels by executing a single properly formatted query.

In one embodiment of the present invention, lists of optional query chains are made available to a user as the user navigates the database. The particular list of optional query chains displayed depends on which table or field is currently being accessed by the user and are created when an analytic application such as DBMS 204 is installed. An example would be a user who navigates to the sales table and discovers that sales metrics are lower than expected. When the user reaches the sales table, a list of optional query chains is displayed. These optional query chains are listed in anticipation of what may be useful to a user who has navigated to the sales table in the database. In this particular case the optional queries could lead the user to tables listing inventory levels, number of customers, a breakdown of individual product sales, etc. The listed query chains will in essence provide a guided analysis for a user who may not be skilled in constructing query chains. The user has the option of using one of the query chains from the list, modifying one of the query chains from the list, or creating their own query chain. Thus the invention will enable less than skilled users to access usable data more reliably and quickly.

In another embodiment, the user can create his/her own query chain in repository 205 and which can be added to the pre-defined query chain list. The invention links all of the tables accessed by the user, creating a query chain. This query chain is stored and will be displayed as one option in the list of optional query chains.

Figure 4:
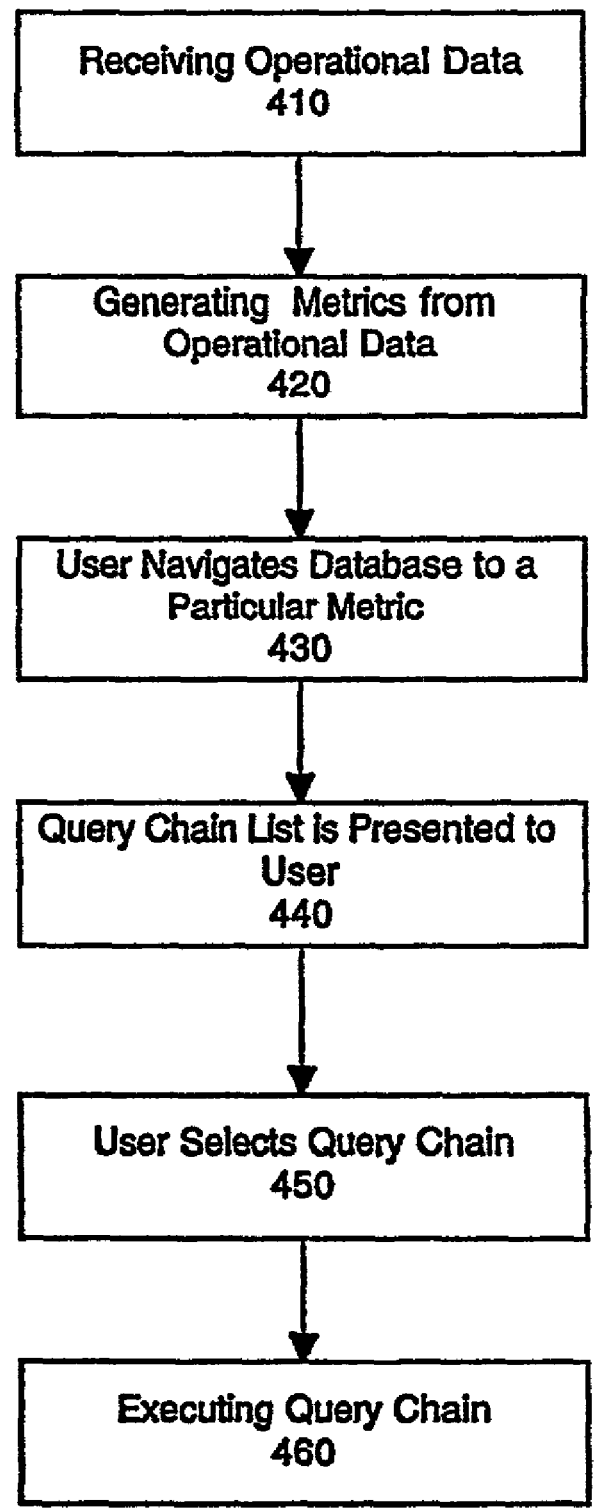
FIG. 4 is a flowchart showing the steps in a process for navigating an analytic application in accordance with one embodiment of the present invention.

FIG. 4 is a flowchart showing the steps in a process 400 for navigating and accessing data (including business metrics, processed data, and raw data) defined by an analytic application in accordance with one embodiment of the present invention. FIG. 500 is a flowchart showing the steps in a process 500 for creating and executing a query chain defined by an analytic application in accordance with another embodiment of the present invention. Processes 400 and 500 can be implemented via computer-readable program instructions stored in a memory unit (e.g., volatile memory 103, non-volatile memory 104, and/or data storage device 105) and executed by processor 102 of computer system 100 (FIG. 1). However, it is appreciated that portions of processes 400 and 500 can be implemented on different computer systems that are linked in a computer system network. In addition, it is understood that the steps in processes 400 and 500 can be repeated as necessary.

In step 410 of FIG. 4, operational data are received from a data source (e.g., data sources 201 of FIG. 2). In step 420 of FIG. 4, metrics are generated using an analytic application such as the TDL process described in the above-referenced U.S. Pat. No. 6,014,670. In step 430 of FIG. 4, the user navigates the database to a particular metric. This can be any field within data repository 205 which contains data relevant to the present query. In step 440, a query chain list is presented to the user. This is a list of pre-defined query chain commands which are expected to be of assistance to the user. The contents of the list of query chain commands is based upon which particular metric which is being accessed by the user. In step 450, the user selects a query chain. The user has the option of selecting one of the query chains listed, modifying one of the query chains listed, or creating their own query chain. In step 460, the query chain option exercised by the user in step 450 is executed. If the option exercised by the user is to create their own query chain, the user also has the option of saving that query chain and adding it to the list of pre-defined queries. By presenting a list of query chain commands to the user, it is possible to provide a guide for analyzing data based upon where the user is in the database. This provides less than skilled users a valuable tool which facilitates their analysis of database information.

Figure 5:
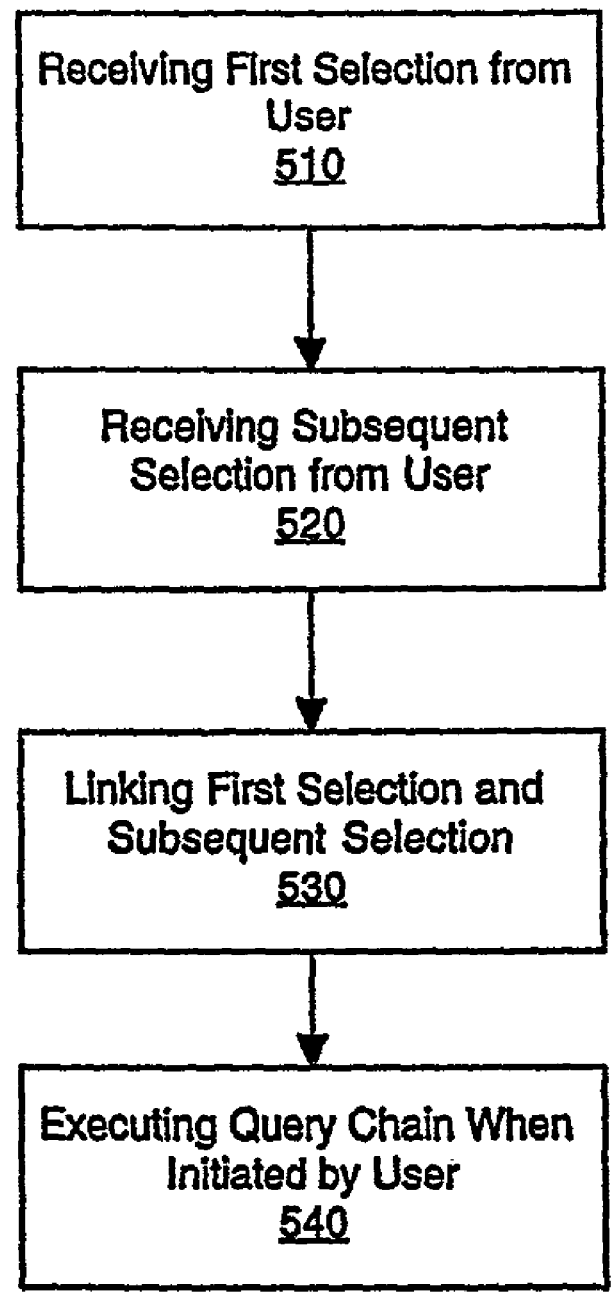
FIG. 5 is a flowchart showing the steps in a process for creating a query chain, in accordance with one embodiment of the present invention.

Referring now to FIG. 5, in step 510 of the present embodiment, a first selection of a data field metric is received from the user. This is the first field in data repository 205 (FIG. 2) accessed by the user. In step 520 of FIG. 5, the invention receives a subsequent selection from the user. It is appreciated that this subsequent selection may be one or more selections made by the user in the act of navigating repository 205. Additionally, multiple query chains can be formed and uniquely identified. In step 530 of FIG. 5, the first selection and each subsequent selection are linked into a query chain and stored. It is this query chain which the invention uses to facilitate navigating repository 205. In step 540 of FIG. 5, the query chain is executed in response to a command initiated by the user. In executing the query chain, the invention returns the user to a designated field, bypassing any intervening fields.

Figure 6A:
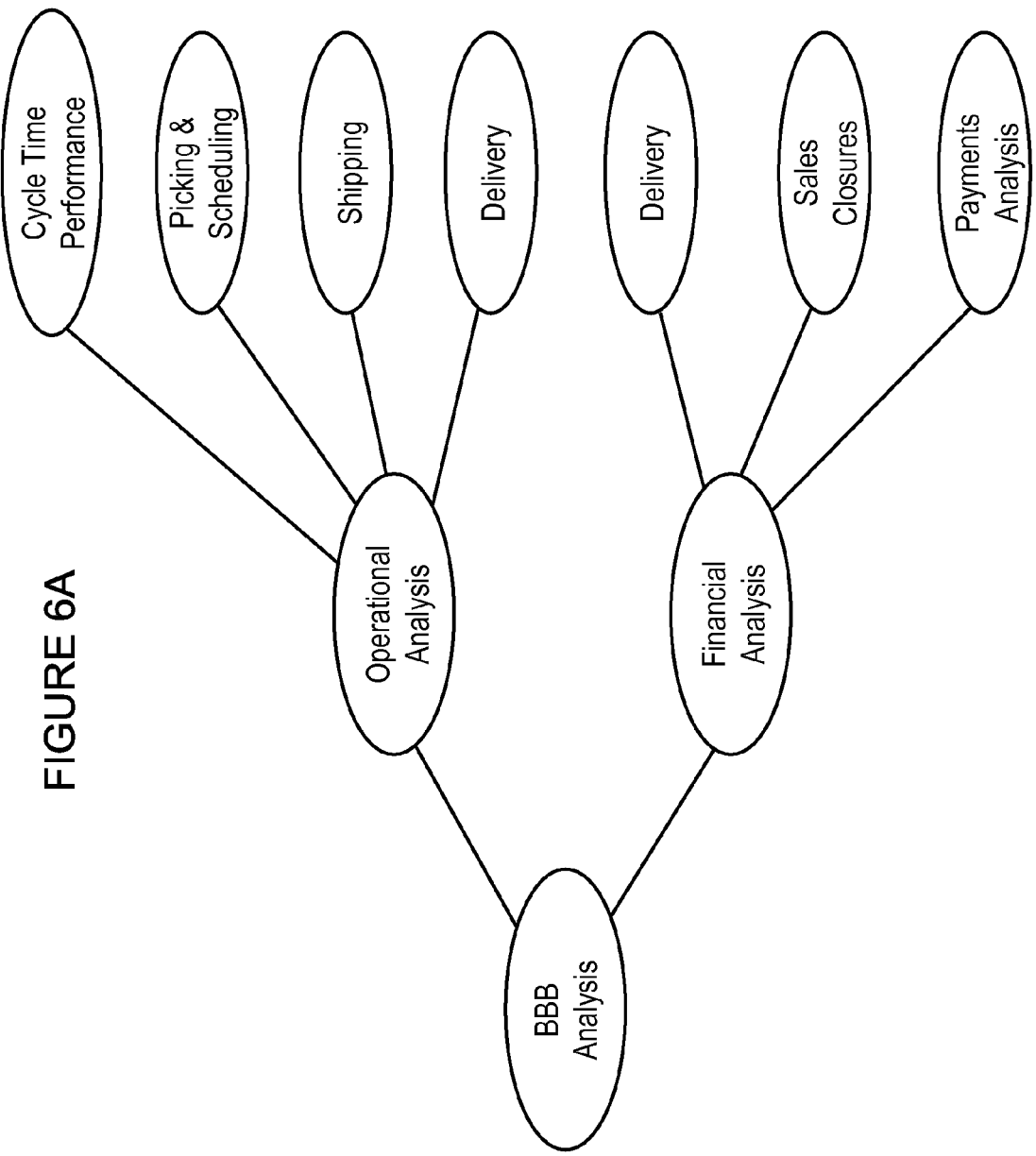
Figure 6B:
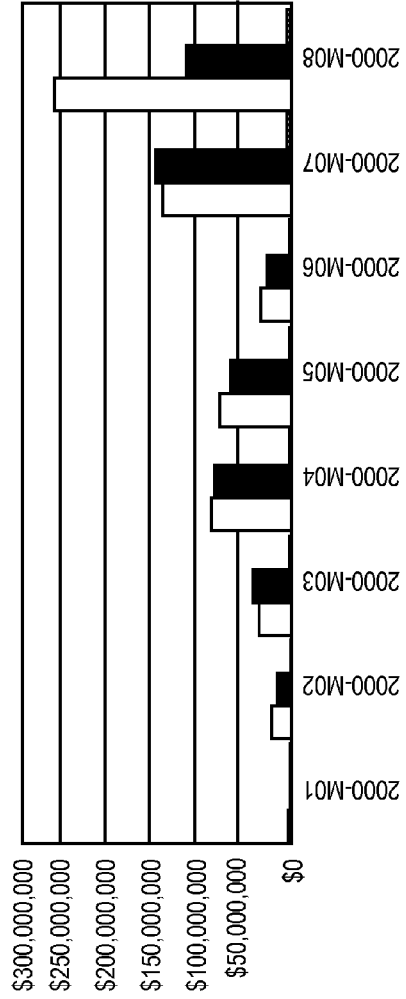
Figure 6B:
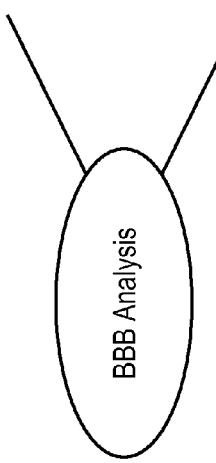
Figure 6C:
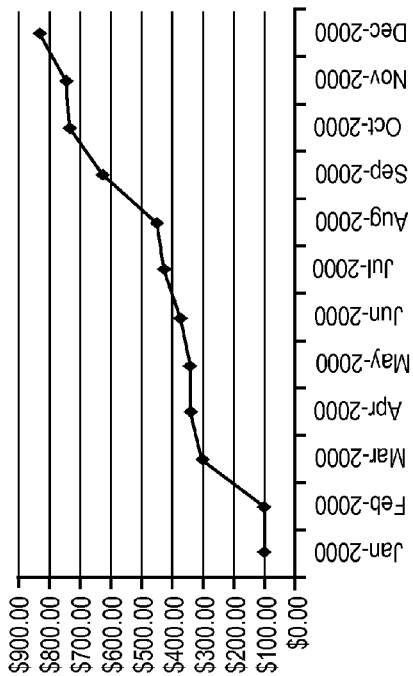
Figure 6C:
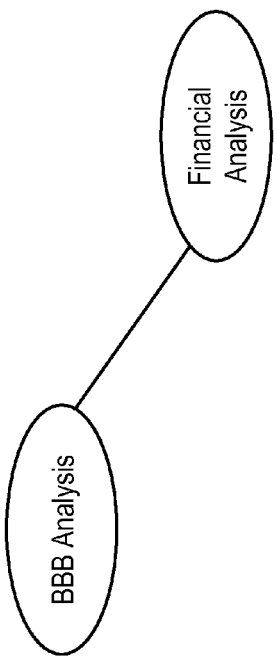

FIGS. 6A-6F show a scenario in which a guided analysis assists a user in obtaining detailed information of business metrics in accordance with one embodiment of the current invention. FIG. 6A, shows the variety of paths a user can follow when navigating a data generated by an analytic application. In FIG. 6B, the user is reviewing a report summarizing bookings, billings, and backlogs. The user notices an increasing trend in backlogs over time. The user also notices that bookings and billings (Invoiced Amount) are not increasing proportionally. At this point, the present invention provides a menu of query options that the user may want to use. The menu is based upon the field that the user is currently accessing (BBB Analysis). In FIG. 6C, the user has chosen a query option to access the financial analysis cell. The financial analysis cell provides an average order value report and suggestions for further reporting and analysis, based on different data scenarios. For example, because the report reveals a steady increase in average order value during this period, the user is guided back one step, then down the operational analysis path, instead of proceeding further down the financial analysis path.

Figure 6D:
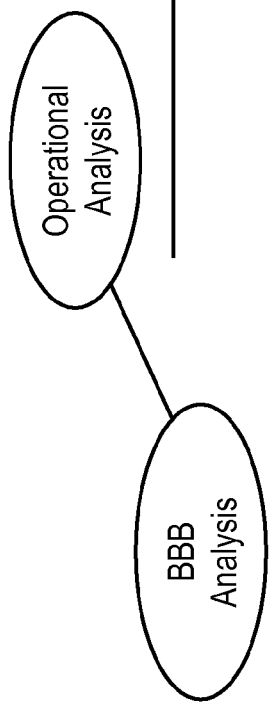
Figure 6D:
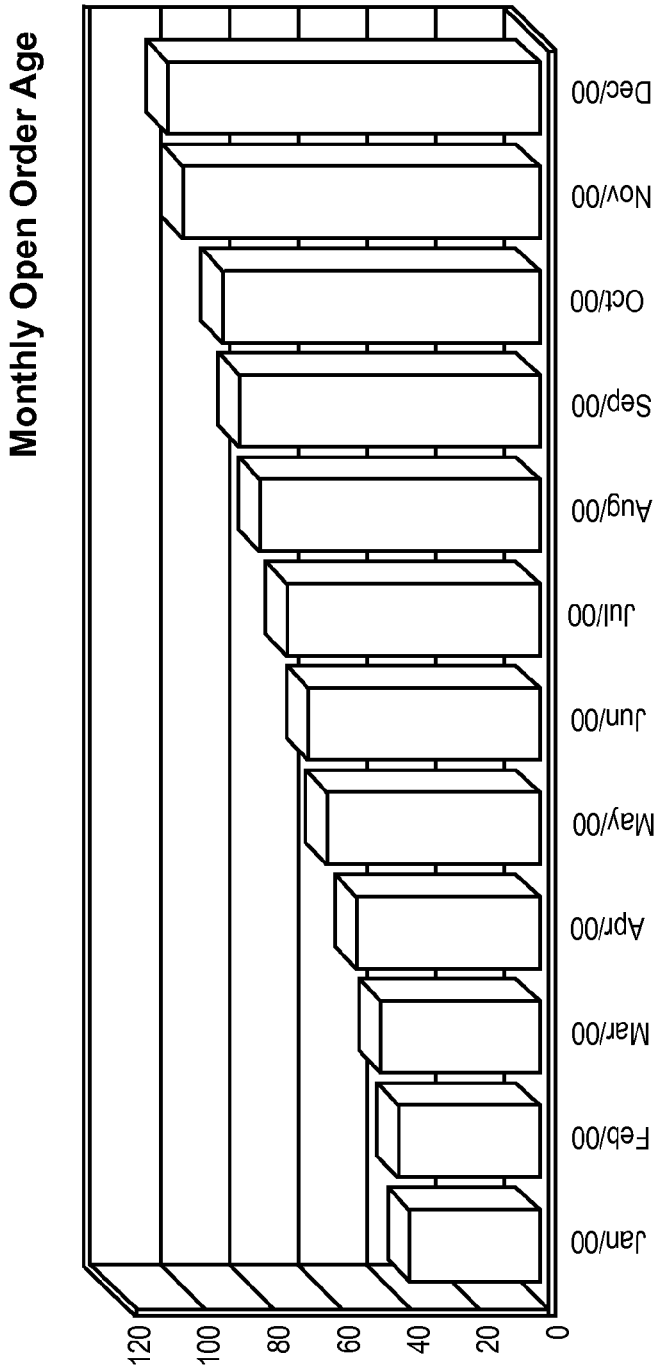
Figure 6E:
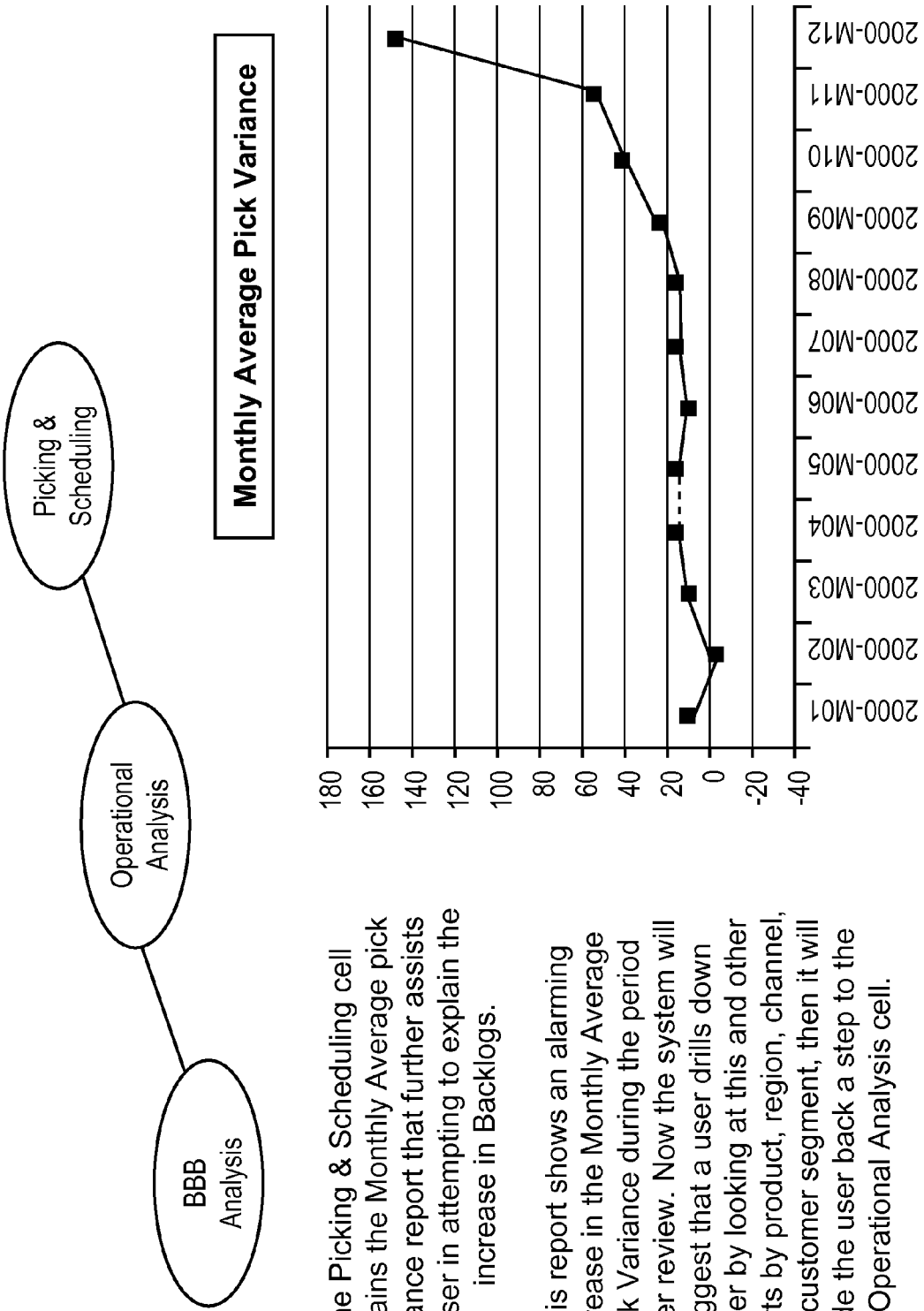

In FIG. 6D, the present invention navigates back up to the BBB Analysis field, then on to the Operational Analysis field. The first guided analysis report the user is lead to while moving down the operational analysis path contains the open order age report. This report confirms that backlogs have been steadily increasing for all products during the period under review. The user is now guided towards the Picking and Scheduling Analysis field. The Picking and Scheduling field of FIG. 6E contains the Monthly Average Pick Variance report that further assists the user in attempting to explain the increase in backlogs. This report shows an increase in the Monthly Average Pick Variance during the period under review. The present invention now suggests that the user drill down further by looking at this and other reports by product, region, channel, and customer segment. It then guides the user back a step to the Operational Analysis field. FIG. 6F shows that the user has chosen this option and stepped back to the Operational Analysis field. The user is now guided to the Cycle Time Performance cell. A report showing Monthly Average Shipped to Invoiced Cycle Time is generated. This report suggests that there may be additional inefficiencies in the organization's internal performance concerning shipping products to invoicing customers. The user can continue from this point down further logical query paths provided by the current invention, or create their own until a clear picture emerges of where company performance has lagged.

In summary, the present invention provides a method and system that can facilitate navigating large databases defined by analytic applications, and that can allow the user to efficiently use his/her time to locate and access information of particular interest. The present invention also provides a method and system that can allow a user to access new information of particular interest in a timely manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modification as are suited to the particular use contemplated. It is intended that the scope of the invention be defined by the Claims appended hereto and their equivalents.

The invention claimed is:

1. A method for navigating a database of metrics generated by an analytic application, the method comprising:
   in response to user selection of a first query, the first query comprising a first set of metrics selected from the database of metrics and a first field:
   (i) executing the first query by a computer system,
   (ii) displaying to a user data corresponding to the first query, and
   (iii) displaying
      a list of queries comprising second sets of metrics selected from the database of metrics and
      second fields related to the first set of metrics, the first field serving as a filter for subsequent queries;
   in response to user selection of a second query as a subsequent query, the second query comprising a selected set of second metrics and a selected second field from the displayed list of queries comprising second sets of metrics selected from the database of metrics and second fields related to the first set of metrics:
   (i) executing the second query, (ii) displaying to the user data corresponding to the selected second set of metrics and selected second field, and (iii) displaying another list of queries comprising third sets of metrics selected from the database of metrics and third fields related to the selected second set of metrics, the selected second field serving as a filter for subsequent queries;

linking the second query as the subsequent query to the first query; and storing the linked queries.

2. The method of claim 1, wherein the third sets of metrics are not directly associated with the first set of metrics.

3. The method of claim 1, wherein the list of queries comprising second sets of metrics and second fields is pre-defined.

4. The method of claim 1, wherein the list of queries comprising second sets of metrics and second fields is modifiable by the user to add new second metrics to the list of queries comprising second sets of metrics and second fields.

5. The method of claim 1, wherein linking the second, subsequent query to the first query provides the user direct navigation to the data corresponding to the selected second set of metrics and selected second field in a subsequent navigation.

6. The method of claim 1, wherein the first set of metrics comprises a single metric.

7. The method of claim 1, wherein the first set of metrics comprises multiple metrics.

8. A computer program product stored in a computer-readable storage medium for navigating a database of metrics generated by an analytic application, comprising:

computer program code encoded on the computer-readable storage medium configured for:

in response to user selection of a first query, the first query comprising a first set of metrics selected from the database of metrics and a first field:

(i) executing the first query, (ii) displaying to a user data corresponding to the first query, and (iii) displaying a list of queries comprising second sets of metrics selected from the database of metrics and second fields related to the first set of metrics, the first field serving as a filter for subsequent queries;

in response to user selection of a second query as a subsequent query, the second query comprising a selected set of second metrics and a selected second field from the displayed list of queries comprising second sets of metrics selected from the database of metrics and second fields related to the first set of metrics:

(i) executing the second query, (ii) displaying to the user data corresponding to the selected second set of metrics and selected second field, and (iii) displaying another list of queries comprising third sets of metrics selected from the database of metrics and third fields related to the selected second set of metrics, the selected second field serving as a filter for subsequent queries;

linking the second query as the subsequent query to the first query; and storing the linked queries.

9. The computer program product of claim 8, wherein the third sets of metrics are not directly associated with the first set of metrics.

10. The computer program product of claim 8, wherein the list of queries comprising second sets of metrics and second fields is pre-defined.

11. The computer program product of claim 8, wherein the list of queries comprising second sets of metrics and second fields is modifiable by the user to add new second metrics to the list.

12. The computer program product of claim 8, wherein linking the second, subsequent query to the first query provides the user direct navigation to the data corresponding to the selected second set of metrics and selected second field in a subsequent navigation.

13. The computer program product of claim 8, wherein the first set of metrics comprises a single metric.

14. The computer program product of claim 8, wherein the first set of metrics comprises multiple metrics.

* * * * *